Figure 1:
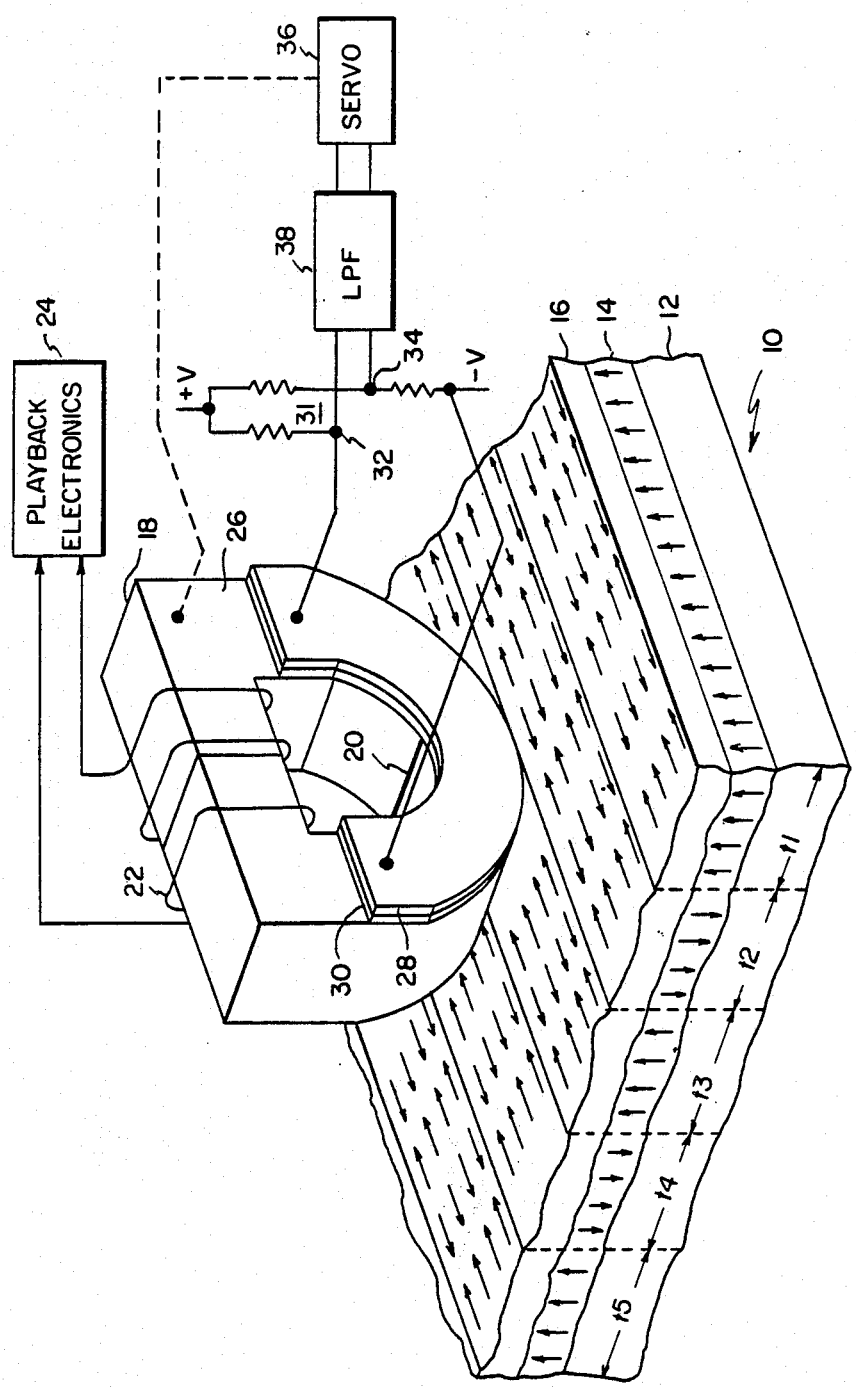

United States Patent [19]

Marchant

[11] Patent Number: 4,652,945
[45] Date of Patent: Mar. 24, 1987

[54] FLUX SENSITIVE TRACKING
[75] Inventor: Alan B. Marchant, Kendall, N.Y.
[73] Assignee: Eastman Kodak Company, Rochester, N.Y.
[21] Appl. No.: 730,135
[22] Filed: May 3, 1985
[51] Int. Cl.$^4$ .................. G11B 21/10; G11B 5/33; G11B 5/74
[52] U.S. Cl. ..................... 360/77; 360/113; 360/131
[58] Field of Search .................. 360/113, 110, 75, 77, 360/78, 131, 134, 135

[56] References Cited

U.S. PATENT DOCUMENTS

| | | | |
|---|---|---|---|
| 3,474,432 | 10/1969 | Sevilla | 340/174.1 |
| 3,614,756 | 10/1971 | McIntosh et al. | 360/77 |
| 3,918,091 | 11/1975 | Walraven et al. | 360/77 |
| 4,048,658 | 9/1977 | Nakagawa | 360/9 |
| 4,152,734 | 5/1979 | Louth | 360/70 |
| 4,157,576 | 6/1979 | Hack et al. | 360/77 |
| 4,163,994 | 8/1979 | Sakamoto et al. | 360/70 |
| 4,164,764 | 8/1979 | Joannou | 360/77 |
| 4,164,781 | 8/1979 | Brown | 360/77 |
| 4,179,720 | 12/1979 | Miura | 360/113 |
| 4,313,140 | 1/1982 | Keidl | 360/77 |
| 4,321,634 | 3/1982 | Lehureau | 360/70 |
| 4,346,413 | 8/1982 | Hack | 360/77 |
| 4,347,534 | 8/1982 | Kimura | 360/77 |
| 4,392,163 | 7/1983 | Rijckaert | 360/76 |
| 4,418,375 | 11/1983 | Hayashida et al. | 360/113 |
| 4,438,465 | 3/1984 | Moriya et al. | 360/22 |
| 4,559,570 | 12/1985 | Schwartz | 360/77 |

FOREIGN PATENT DOCUMENTS

| | | | |
|---|---|---|---|
| 1130899 | 6/1962 | Fed. Rep. of Germany | |
| 54-25704 | 2/1979 | Japan | 360/75 |
| 57-113414 | 7/1982 | Japan | 360/135 |
| 58-166526 | 10/1983 | Japan | 360/113 |

OTHER PUBLICATIONS

Horne et al., "Skin Effect Magnetoresistive Devices," *IBM Technical Disclosure Bulletin*, vol. 18, No. 10, Mar. 1976, p. 3415.
Patents Abstracts of Japan, vol. 2, No. 84, 7/8/78, p. 3691, 53-49415 (Suwa Seikosha K.K.).
Patents Abstracts of Japan, vol. 9, No. 54, 3/8/85, p. 340, 59-191128 (Fujitsu K.K.).
Patents Abstracts of Japan, vol. 9, No. 214, 8/31/85, p. 384, 60-74116 (Hitachi Seisakusho K.K.).
Patents Abstracts of Japan, vol. 9, No. 296, 11/22/85, p. 407, 60-131612 (Nippon Denki K.K.).
Patents Abstracts of Japan, vol. 9, No. 182, 7/27/85, p. 376, 60-52974 (Seikosha K.K.).
IBM Technical Disclosure Bulletin, vol. 19, No. 11, 4/77, pp. 4226-4227, Schneider et al., On-Data-Track Servoing.
IBM Technical Disclosure Bulletin, vol. 17, No. 4, 9/74, pp. 979-980, McCormick, Multielement Servoing Head.
IBM Technical Disclosure Bulletin, vol. 20, No. 9, 2/78, pp. 3673-3674, McEfee, Read/Write Servo Magnetic Head.
IBM Technical Disclosure Bulletin, vol. 3, No. 2, 7/60, p. 27, Bacon et al., Magnetically Derived Servo Information.
IBM Technical Disclosure Bulletin, vol. 18, No. 7, 12/75, pp. 2248-2249, Paska, Track Crossing Responsive Device.

*Primary Examiner*—John H. Wolff
*Assistant Examiner*—Matthew J. Bussan
*Attorney, Agent, or Firm*—Robert F. Cody

[57] ABSTRACT

Given a medium comprised of a vertically recordable underlying region of a magnetic material and a cooperating overlying region of horizontally recordable material, the invention calls for the pre-recording of such tracking information, in the underlying region, that between adjacent tracks there occurs a vertically disposed flux reversal in the underlying region, each such track being approximately the width of a playback core disposed to read data recorded in the overlying region. Deposited on the side face of the playback core, in accordance with the invention, is a magneto-resistive element. So long as the playback core is on-track, the magneto-resistive element "sees" equal vertical fields on either side of the track edge; but should the playback core start to mistrack, the magneto-resistive element will see vertical flux of one or another polarity. Such polarized vertical flux translates into a corresponding resistance change in the magneto-resistive element which, in turn, is employed to correct the mistracking.

4 Claims, 2 Drawing Figures

FLUX SENSITIVE TRACKING

BACKGROUND OF THE INVENTION

1. Field of the Invention

This invention relates in general to magnetic recording and more particularly to improved apparatus for providing tracking control during the playback of recorded signal information.

2. Description Relative to the Prior Art

There is a trend toward the packing of greater and greater amounts of data on magnetic storage devices such as floppy magnetic discs and magnetic tape. Implicit in such trend is the requirement that data tracks on such recording devices be narrower and narrower, and more closely packed together. In the recently announced 3.3 megabyte floppy disc, for example, the recording tracks thereof are 0.0047" wide, and on a 0.0052" pitch (guardband between tracks of 0.0005"). Similarly, with a high-track-density multitrack magnetic head, say of a type that provides 400 tracks per inch, tracks would be 0.0020", given guardbands of 0.0005". It is clearly of concern, therefore, that during playback of recorded information the head follows the correct track precisely so that the information signal is recovered from the correct track, and not from a neighboring region.

It is known in the art to record tracking control signals in a magnetic recording medium as a vehicle for preventing head-to-medium wander during playback of information recorded in the medium. Representative prior art in this connection may be found in U.S. Pat. No. 3,474,432 which depicts the use of various prerecorded frequencies in respective tracks, the signals being mixed in such a way as to cause head position error signals to be generated in response to head-to-medium wander. Similarly, more recently issued U.S. Pat. No. 4,258,398 calls for the use of paired prerecorded tracks as signal-sources for head orienting/positioning in connection with a multitrack configuration. Other and varied tracking control techniques have been demonstrated and taught in the art, albeit that such techniques are wasteful of medium (requiring relatively wide tracking-control tracks), exhibit less than optimally-tight control and, if narrowed, are wanting when it comes to the matter of sensitivity.

A characteristic which is peculiarly common to prior art tracking-control techniques such as those mentioned above is that such techniques are dependent on flux rate-of-change while reading a control track. Attendantly, such techniques are virtually useless at low playback speeds and/or when the recorded control track signal is of too short a wavelength as to be readable during playback of the control track.

Known to the art, also, are the following:

a. The use of a multi-layered (discrete or otherwise) magnetic medium in which tracking control signals are pre-recorded in an underlying layer of the medium, and in which the surface layer is employed for data recording.

b. Vertical recording techniques whereby the magnetization vectors associated with information recorded in a magnetic recording medium are oriented perpendicular to the plane of the medium.

c. The use of a flux sensitive magneto-resistive head to free the playback of magnetically recorded signal information from dependence on flux rate-of-change.

SUMMARY OF THE INVENTION

Given a medium comprised of a vertically recordable underlying region of magnetic material and a cooperating overlying region of horizontally recordable material, the invention calls for the pre-recording of such tracking information, in the underlying region, that between adjacent tracks there occurs a reversal of the vertical flux component, each such track being approximately the width of a playback core disposed to read data recorded in the overlying region. Deposited on the side face of the playback core, in accordance with the invention, is a magneto-resistive element. So long as the playback core is on-track, the magneto-resistive element "sees" no net vertical field; but should the playback core start to mistrack, the magneto-resistive element will see a net vertical flux of one or another polarity depending on whether the magneto-resistive element is shifted over the track or over the neighboring region. Such polarized vertical flux translates into a corresponding resistance change in the magneto-resistive element which, in turn, is employed to correct the mistracking.

The invention will now be described with reference to the figures wherein

Figure 2:
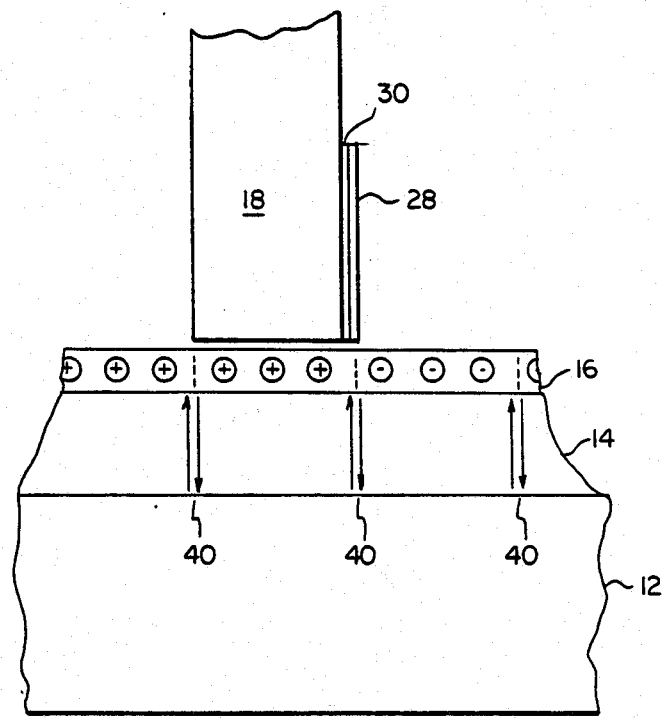

FIG. 1 is a perspective schematic view of apparatus embodying the invention, and FIG. 2 is a side elevational view of another embodiment of the invention.

Referring to FIG. 1, a magnetic medium 10, such as a recording disc, has a base 12 upon which—in this embodiment—two recording layers 14, 16 are deposited. The layer 14, which is relatively thick, is comprised in part of high coercivity magnetic particles which are suitable for vertical recording; and the layer 16, which is comparatively thin, is comprised in part of high coercivity magnetic particles which are suitable for along-the-track horizontal recording. As indicated, adjacent tracks $t_1$, $t_2$, $t_3$ ... $t_n$ have oppositely polarized track-defining vertical recordings in the layer 14; and data recordings (as is conventional) are recorded, respective of such tracks, in the layer 16.

A playback core 18 (which may also serve as a recording element) has a transducer gap 20 disposed, in FIG. 1, crosswise of the track $t_3$, such gap having a cross-track dimension approximately equal to the width of the track. A transducer coil 22 inductively linked with the core 18 produces a signal corresponding to the rate of change of flux sensed by the gap 20; and such signal is applied to playback electronics 24, as is conventional.

On the side, i.e. widthwise, face 26 of the core 18, thin-film magneto-resistive element 28 is formed, typically by deposition, albeit that a magnetic insulating material 30, such as $SiO_2$, is provided between the core 18 and the magneto-resistive element 28. The magneto-resistive element may be provided with a canted easy-axis; or, if desired, the magneto-resistive element may be provided with ancillary means, known to the art, for biasing its magnetization.

With the core 18 so positioned, say, on the track $t_3$ that the magneto-resistive element 28 is as indicated in FIG. 1, the magneto-resistive element senses equal-strength vertical fields of opposite polarity from the $t_2$ and $t_3$ tracks, and attendantly produces no resistance change from its reference resistance. The magneto-resistive element, in this embodiment of the invention, forms part of an appropriately balanced bridge network 31 and, as it causes the core 18 to track back and forth across the between-track ($t_2$-to-$t_3$) boundary, the points 32, 34 of the bridge network 31 develop a low frequency signal, first as a result of a resistance change one way as the element senses vertical flux of a first polarity, and then the other way as a result of sensing vertical flux having a reverse polarity. This low frequency tracking signal, which is well outside the passband of the playback electronics 24, is applied to a tracking servo 36 via a low pass filter 38. (If desired, the response of the servo 36 may be set so that it responds only to low frequency input signals, thereby obviating the low pass filter 38.) The servo 36, in turn, adjusts the relative core-to-medium position to cancel the servo input tracking error signal.

By use of the invention, not only is continuous tight control to the boundary between adjacent tracks provided, but there is absolutely no medium-wasting tracking signals recorded on the surface of the medium . . . and the tracking pattern does not alter the readout signal.

The invention has been described in detail with particular reference to a presently preferred embodiment, but it will be understood that variations and modifications can be effected within the spirit and scope of the invention. For example, it is within the purview of the invention to provide tracking control to tracks defined by paired vertical flux reversals 40 as indicated in FIG. 2, such flux reversals being sensed by the magneto-resistive element 28 as described in connection with FIG. 1. Further, it would be within the scope of the invention to employ a second flux sensitive element on the opposite face of the playback core, thereby to permit a balanced tracking control system. And, still further, while the invention is depicted in relation to a conventional gapped playback core, the invention is just as useful with a slant-gap core.

What is claimed is:

1. Magnetic recording apparatus comprising
   a. a magnetic recording medium comprised of a base and layered first and second overlying flux supporting material covering said base, said first flux supporting material storing therein horizontally recorded data signals in data tracks which are of a given track width, and said second flux supporting material storing therein vertically recorded flux reversals at the edges of said tracks, and
   b. a magnetic playback head having a track width that approximates the width of said tracks and having on a widthwise face thereof a flux sensitive structure for sensing the null that occurs between the track-defining flux reversals of said second flux supporting material when said playback head is on-track with respect to one of said data tracks of said first flux supporting material, said playback head being positioned for signal producing cooperation with said magnetic recording medium.

2. The apparatus of claim 1 wherein said flux sensitive structure is a thin-film magneto-resistive element deposited on the playback head.

3. The apparatus of claim 1 further comprising
   a. circuit means, cooperative with said playback head, for reproducing high frequency data signals stored in said data tracks, and
   b. servo means responsive to the comparatively low frequency output of said flux sensitive structure for so positioning said playback head that said flux sensitive structure resides at one or another of said between-track flux reversal nulls.

4. The apparatus of claim 3 wherein said flux sensitive structure is a thin-film magneto-resistive element deposited on the playback head.

* * * * *